May 5, 1953      W A. ERNST      2,637,537
DRINK MIXER AGITATOR

Filed Dec. 20, 1950      2 SHEETS—SHEET 1

INVENTOR.
W. ARTHUR ERNST
BY
Wheeler, Wheeler & Wheeler
ATTORNEYS

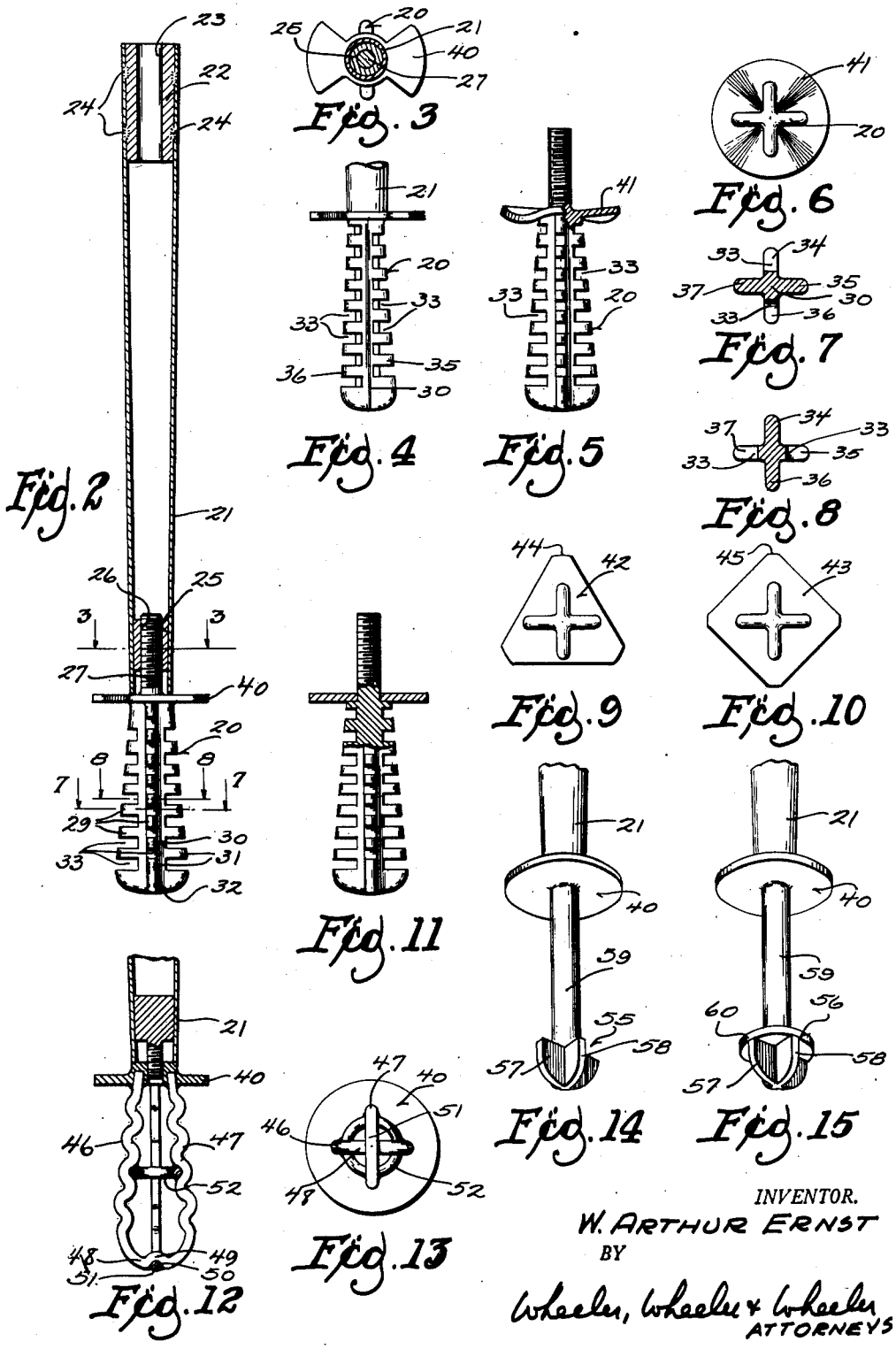

Patented May 5, 1953

2,637,537

UNITED STATES PATENT OFFICE 2,637,537

DRINK MIXER AGITATOR

W Arthur Ernst, Racine, Wis.

Application December 20, 1950, Serial No. 201,767

4 Claims. (Cl. 259—134)

My invention relates to drink mixer agitators.

The agitation, mixing or whipping of the ingredients of beverages at the modern soda fountain or bar presents not only the problems which have been involved heretofore, but also the consistent modern problem presented by very solidly frozen ice cream. Power operated agitating means have been devised in many different shapes, each intended to meet one feature of the problems involved, but usually emphasizing other difficulties; and I have, therefore, developed the agitator-mixer or dasher for a beverage mixer best suited to the many problems of beverage mixing presented at the modern soda fountain or bar.

Where the agitator is shaped and designed according to the previously known practices one of the principal physical phenomena presented in the mixing of an ice cream loaded beverage such as the malted milk or milk shake is the extremely rapid rotation of the entire body of mix ingredients which prevails throughout the greater portion of the time that a power agitator is operated. Evidence of this phenomena is apparent in the whirling motion of the entire mix mass which can be readily observed immediately upon the inception of a mixing operation with a prior art power driven dasher. There is a close approach of the speed of rotation of the mix ingredients to the speed of the motor or agitator shaft itself, and it is apparent that a large percentage of the actual mixing and reduction of size of solid ice cream masses takes place between the rapidly rotating mix mass and the walls of the container in which the mixing is taking place. This is a slow operation and it will be apparent from the description of my invention that quite a different agitating and mixing action takes place in the use of my agitator-mixer.

One of the drink mixing operations which illustrates the inadequacy of prior art agitators involves the preparation of what is known as "heavy" malted milk drink. Previously known agitators tend to move the hard balls of ice cream, used in such a drink, to the outside of the container in which the mix action is taking place. These balls of ice cream are only reduced in size by friction against the container while the agitator performs an unnecessarily thorough beating action upon the lighter and more fluid constituents of the drink and the resulting product served to the customer consists of very thin fluid in which appear the large disintegrated lumps of ice cream. This is not the "heavy" drink the customer prefers.

In contrast with the slow and objectionable operation of previously known mixers, my agitator-mixer immediately splits the mix ingredients in a cutting action, draws the lighter mix ingredients into the split mass, immediately shreds, mixes and creams the mix ingredients in the immediate vicinity of the agitator-mixer, and never causes the entire mix mass to rotate in the container at a relatively high speed.

Furthermore, in the operation of previously known mixers a relatively moderate speed of operation has been necessary if a lighter or more watery mix is to be operated upon. Such previously known mixers tend to throw a less viscous mix out of the mixing cup and, if the speed of the agitator or mixer is reduced, something less than the desired creamy beverage consistency is attainable.

As contrasted with this inadequacy of the prior agitators and mixers, my agitator-mixer does not throw a light or watery mix upwardly and outwardly, but tends to concentrate the violent action of my agitator-mixer below a throwing disk which is located at a relatively low point in the container in which the mixing takes place. Also when the container is withdrawn from my agitator-mixer, or the agitator-mixer is withdrawn from the container, my throwing disk tends to clear the entire rotating device before any of the wetted portions are in a position to throw mix ingredients out of the container.

An additional objective and attainment of my invention is the speeding up of beverage mixing operation in the sense that the entire operation may be completed in a much shorter time than has been heretofore realized with a reasonably low powered agitator-mixer.

My improved agitator-mixer as used on a mixing spindle comprises outstanding cutting teeth, usually in rows. The spindle is so moved and the teeth so spaced and arranged that the successive teeth presented against the mix mass are staggered. Furthermore, the teeth are of greatest length in position to be deeply immersed and decreasing length in each of the rows in an upward direction and are substantially radial. The spindle adjacent the shorter teeth is provided with a flat or wavy throwing disk and the portion of the agitator-mixer adjacent the longer teeth is shaped to penetrate and split a mass of hard frozen ice cream or other similarly homogeneous mix material. The action in a mix mass effects thorough whipping and mixing without throwing any portion of the mass over the wall of the vessel in which the mixing is done.

In the drawings:

Fig. 2 is a side elevation of an agitator-mixer embodying my invention, the head being shown in assembled relationship with a tubular mixer shaft assembly, the parts of this assembly being shown in vertical section.

Fig. 3 is a section on line 3—3 of Fig. 2.

Fig. 4 is a side elevation of the lower portion of the structure shown in Fig. 2 but showing the agitator-mixer head as it is seen when the agitator-mixer is rotated about its vertical axis 45 degrees from the position shown in Fig. 2.

Fig. 5 is a view of an alternative form of agitator-mixer wherein the centrifugal throwing disk has a wavy convolution.

Fig. 6 is a bottom view of the agitator shown in Fig. 5.

Fig. 7 is a section on line 7—7 of Fig. 2.

Fig. 8 is a section on line 8—8 of Fig. 2.

Fig. 9 shows a bottom view of an alternative form of agitator-mixer throwing disk.

Fig. 10 shows a bottom view of a second alternative form of agitator-mixer throwing disk.

Fig. 11 is a side elevation comparable to Fig. 5 but showing a centrifugal throwing disk which is not integral with the remaining portion of the agitator-mixer, the disk and a portion of the agitator-mixer being shown in vertical section.

Fig. 12 is a view, partly in section and partly in elevation, of a modified embodiment of my agitator mixer head and a fragmentary portion of the shaft to which it is mounted.

Fig. 13 is a bottom view of the agitator-mixer shown in Fig. 12.

Fig. 14 is a perspective of an alternative form of agitator-mixer including a cutting button.

Fig. 15 is a perspective of an additional alternative form of agitator-mixer with a cutting type button and contiguous minor thrower disk.

Like parts are designated by the same reference characters throughout the several views.

Figure 1:
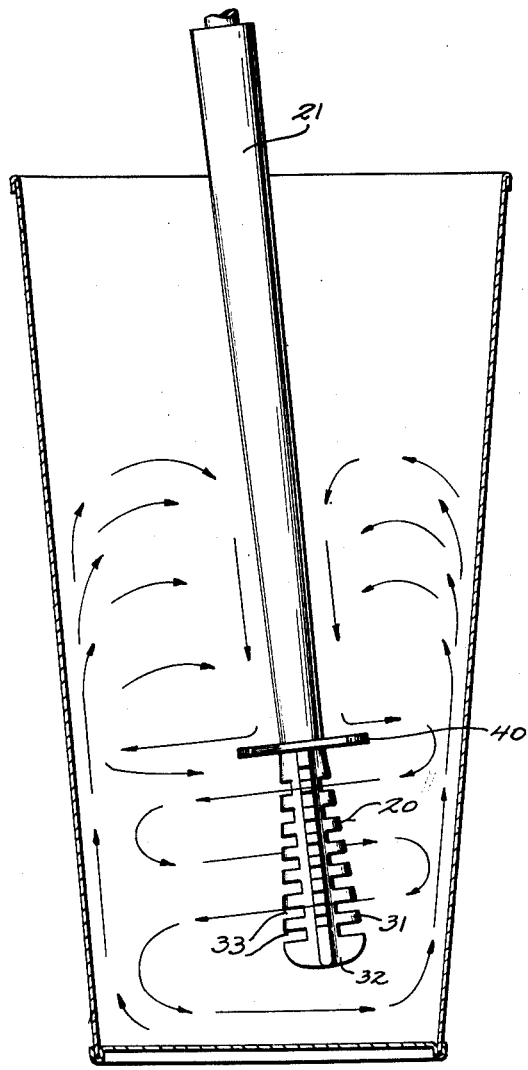
Fig. 1 is a vertical section through a container with mix ingredients therein, with my new agitator-mixer in operation in the mix and showing, by means of arrows, the movement of the mix ingredients during a drink mixing operation.

In one of the preferred forms of my invention, as shown in Figs. 1 and 2, an agitator-mixer 20 is mounted to the bottom end of a tapered tubular shaft 21. At the upper end of the tubular shaft is an inset mounting bushing 22 having a straight bore 23 to receive the shaft of a conventional electric motor which is used to drive the shaft and my agitator-mixer. This bushing 22 may be secured by spot welding it as indicated at 24.

Before the bushing 22 has been permanently assembled with the tubular shaft 21, I drop into the lower portion of the shaft a tapered bushing 25 which is provided with a threaded bore 26 for the reception of the threaded shank 27 which is integral with the agitator-mixer 20. Thus when the threaded shank of the agitator-mixer is assembled threadedly with the tapered bushing 25, the bushing is drawn tightly into the lower portion of the shaft 21 and the agitator-mixer is drawn directly against the end of the tube.

In this manner the tapered bushing and tapered shaft cooperate frictionally to mount the agitator mixer, and the shaft need not be provided with an integral tap to receive the threaded shank 27. This, of course, facilitates production of the tubular shaft.

The agitator-mixer 20 includes a central core 30 of generally cruciform cross section, each of the radially extending blades 31 whereof extends radially from the core and is marginally squarely notched as is shown clearly in the drawings. The extended discontinuous peripheral margins of the mixer head are tapered from the smaller diameter adjacent the end of the tubular shaft 21 to a larger diameter at the cutting head 32 at the lower extremity of the agitator-mixer. However, the inner surfaces provided by the notches 33 present discontinuous lines delineating a cruciform shape which has the same radial extent throughout from top to the bottom.

It will be noted that the notches in the respective radially, extending blades 31 are staggered and that the individual fingers 29 extending outwardly between the notches 33 beyond the central core 30 register, rotatively, with a notch 33 in a preceding blade. As considered rotatably in an agitator-mixer having four radial blades 34, 35, 36 and 37, the notches in blades 34 and 36 are opposite one another as seen clearly in Figs. 2 and 7 and the notches in blades 35 and 37 are opposite one another. This is shown most clearly in Fig. 8.

When an agitator is withdrawn from a beverage container, the motor and agitator are usually still spinning, and the relatively high speed of the agitator is sufficient to build up centrifugal forces adequate to throw off the small accumulation adhering to the agitator. Naturally there will be some accumulation of mix material in the "flutes" between the radial blades of my agitator-mixer and I have devised a thrower disk as will now be described.

Between the agitator-mixer 20 and the lower end of the tubular shaft 21 I provide a radially extended thrower disk 40 which has a diameter considerably greater than the agitator-mixer as will be seen in Fig. 2; this thrower disk may be made in any one of several different configurations as shown in Figs. 3, 6, 9 and 10. It is of importance that this thrower disk is irregular in shape either with respect to discontinuous peripheral outline, or to rippling or convoluted marginal extremity.

A throwing disk shown at 41 in Fig. 5 is a complete circular washer-like member, formed around its periphery so that the margins have a wavy configuration. This is shown in Fig. 6 which is a bottom view of this complete washer-like throwing disk.

The throwing disks shown at 42 and 43 have triangular and square general outline respectively but the outer corners are clipped as at 44 for the triangular throwing disk and 45 for the square disk.

There is some cohesiveness to most drink mix ingredients in the mix mass and as the container is withdrawn or the agitator-mixer is withdrawn from the container the thrower disk frees itself from the mix mass. Then in a short interval of time, practically instantaneously, the mix masses drawn from the flutes between the blades and fingers, and actually from the tubular shaft 21, are thrown out by the enlarged diameter of the thrower and the greater centrifugal forces over its surface.

In Figs. 12 and 13 I have shown an agitator mixer wherein the blades take the form of convoluted side wires 46 and 47 joined at their lower extremities by a curved cutter head portion 48:

one of the cutter heads 48 is bent at 49 to provide an indentation 50 into which the other cutter head as shown at 51 in Fig. 12 may be engaged so that each of the sets of side wires may be braced against the other.

Approximately midway in the vertical length of the agitator-mixer shown in Fig. 12, I provide a brace ring 52 which is received in the convolutions of the side wires 46 and 47, and it may be welded into position as indicated to stiffen the entire wire assembly.

In Figs. 14 and 15 I have shown two alternative forms of agitator-mixers 55 and 56. These are somewhat alike in that the cutting head of each presents two blades 57 and 58 corresponding somewhat generally to the cutting head provided by the portions 32 of the agitator-mixer shown in Fig. 2. Each of the cutting heads shown at 55 and 56 is at the lower extremity of an agitator-mixer core 59 which is shaft-like and has a throwing disk 40 of washer-like characteristics. The cutting head at 56 is provided with a minor throwing disk 60 to overlie the upper margins of the blades 57 and 58.

The cutting heads in the agitator mixers shown in the drawings have a fundamental principle of operation, namely, a cutting and dissecting operation with respect to solid masses of ice cream or other mix ingredients. I have referred above to the observation which has been made with respect to mode of operation of prior art mixers, wherein the ingredients such as ice cream tend to remain in a solid mass upon the mixer shaft and agitator and to turn therewith so that attrition takes place between the revolving mass and the side walls of the container, where the mixing action takes place.

As exemplified by the cutting heads 55 and 56 my agitator-mixer includes means for cutting, dissecting or separating portions of the mix ingredient mass from one another, to assure that the mixer agitator will not take unto itself the ingredient mass and force it to rotate as a unit. On the contrary the agitator-mixer splits the mass and permits the entry into the center of the mass of the lighter, more fluid elements of the mix aggregate. Then in the continued rotation of the agitator-mixer made in accordance with the principles of my invention the greater centrifugal action takes place near the bottom of the container under the forces established by the greater diameter of my agitator-mixer in the zone affected by the cutting head 32 or 55—56.

It will be observed in a container equipped with my agitator-mixer and provided with a typical ice cream beverage mix that there is relatively little rotative motion of the mix mass and that there is relatively slow motion of the ingredients at the surface of the liquid in the container, but it is obvious from the results obtained that a truly remarkable mixing action is taking place in such a mix mass below the throwing disk 40. Upon experiment and close inspection it is found, as indicated by the arrows in Fig. 1, that the heavy or more solid ingredients of the mix are carried up along the margins of the container to a point at or below the level of the throwing disk 40 and then caused to flow in toward my agitator-mixer. This flow is induced by the centrifugal action of the longer, more deeply immersed fingers 33 which throw the mix materials outwardly at the bottom of the container as shown in Fig. 1. To replace the centrifugally thrown material, a current is set up as shown by the arrows in Fig. 1 and the flutes between the rows of teeth 33 constitute channels for flow of shredded and comminuted mix ingredients. If a tooth in one row does not hit a particular particle of mix, a tooth in the next row will strike it, since the teeth are staggered.

As shown in Fig. 1 the throwing disk 40 pulls the mix downward along the shaft 21 and a certain amount of air is drawn down with it to aerate the drink whether the ice cream or other heavy material is slush or fluid. As this portion of the mix mass is drawn down to the top of the thrower disk it is thrown outwardly centrifugally against the side of the cup or container. Part of this flow of the mix mass is carried on upwardly by the stream of material which moves up the walls of the container but there is a diversion of some of this stream into a centrally directed stream moving in under the throwing disk 40. This centrally moving stream as shown by the arrows in Fig. 1 is brought into the zone of action of my mixer agitator 20 which shreds the hard chunks of ice cream or other shreddable mix materials. As indicated above the longer fingers 31 toward the bottom of my mixer agitator draw the mix mass outwardly with greater force and there is therefore a downward movement of the mix mass stream past my agitator-mixer arms and then outwardly along the bottom portion of the container whereby to establish the stream of mix material upwardly along the wall of the container. After this slush leaves the top, it is drawn down very slowly. In fact, if it is watched at a time when tracer fluids are added to the mix, it is possible to see that the slush is drawn down from 4 to 8 times per minute, with the exception of any hard lumps such as ice cream. If a hard lump of ice cream goes to the top of the mix, it is picked up immediately and drawn right back down the shaft 21, down to the thrower disk 40 and then in under the thrower disk for a repeated action by my agitator-mixer. I have mixed drinks in which the ice cream was already turned into slush and have left the mixer in operation in the mix for as many as 10 minutes during which time the drink did not thin out as would have occurred in any other mixing operation.

It is a descriptive observation that instead of mixing by a whirling or whirlpool motion my agitator-mixer mixes by blending and one of the principal contributing factor is the thrower disk which slows down the upward travel of mixed material along the walls of the container by throwing centrifugally a stream of mix ingredients outwardly from the throwing disk to break up the peripheral upwardly traveling stream. The only violent action resulting from the operation of my agitator-mixer is centralized below the plate 40. As the container is withdrawn from the agitator-mixer upon completion of the batch operation, the agitator-mixer cleans itself, first by throwing the material outwardly from the cutter head 32. No spattering or loss of material from the container results from the operation of my agitator mixer or the withdrawal of the agitator-mixer from the container.

With certain types of materials to be mixed the thrower plate 40 may be best shaped as seen in Figs. 3 and 4. Here a certain amount of chopping action takes place when the material to be mixed is drawn from above in the very slight vortex which forms about the tubular shaft 21, but when the material to be mixed is of a lighter character, having more fluid characteristics, a solid disk with convolutions in its contours as shown in Figs. 5 and 6 is more effective, the plate 41 acting somewhat as an anti-cavitation plate. Figs. 9 and 10 show alternative forms of plates 42 and 43 which are better adapted for heavy mixes.

In any event it is of importance that there be a cutting action by a cutting head 32, 55 or 56, and in the wire formed agitator-mixer shown in Fig. 12 a compromise is attained since the wires accomplish a cutting and agitating effect.

It is of importance that the agitator-mixer at the lower end of the tubular shaft be light in weight and of as great tensile strength as is reasonably possible, so as to reduce the tendency to whip the shaft while it is rotating at high speeds. Furthermore, the material must be such as to withstand corrosive action by any of the ingredients which are to be mixed. I have, therefore, devised an aluminum alloy according to the following formula in which the various ingredients and their amounts are stated in terms of percentage by weight for ordinary soda fountain and cocktail bar use. I have found this formula to be highly satisfactory for strength, sanitation and corrosion resistance.

|  | UC 100.4 Aluminum | |
| --- | --- | --- |
|  | Max. | Min. |
| Copper | 1.50 | 0.25 |
| Zinc | 9.00 | 7.00 |
| Nickel | 0.20 |  |
| Iron | 1.00 |  |
| Manganese | 0.60 | 0.20 |
| Silicon | 0.40 |  |
| Magnesium | 0.60 | 0.20 |
| Titanium | 0.30 | 0.10 |
| Chromium | 0.30 |  |
| Aluminum | Balance |  |

I have found that the tensile strength of this aluminum alloy is approximately 31,000# per square inch and the lightness is such as to cause no appreciable whip when used with a tapered tubular shaft as shown in Fig. 2.

From the above description it will be apparent that such a drink mix as a "heavy" malted milk is not rotated in the container at a speed approximating the speed of rotation of the motor shaft 21; on the contrary my agitator-mixer draws any hard balls of ice cream into the zone of operation of the agitator-mixer so as to shred such balls and to create a "slush" which is the criterion of the desired "heavy" mix. This operation is so quickly and thoroughly done that there is little tendency to melt the slush and the product is a cold attractive drink.

I claim:

1. An agitator-mixer and revoluble tubular shaft therefor, said tubular shaft having tapered side walls and an interior loosely mounted threaded nut, the agitator-mixer having a threaded shank receivable into engagement with the nut whereby to draw the agitator-mixer against the end of the revoluble shaft and tighten the nut against the tapered walls, said agitator-mixer having a thrower disk adjacent the shank in position to abut said end of the revoluble shaft.

2. An agitator-mixer head for use at the end of a mixer shaft and comprising a central coupling means for connection with the shaft, radial blades having exposed edges at their lower ends and outer sides, the end exposed edges being adapted to cut and the side exposed edges to mix the material engaged thereby, and a plate extending to a much greater radius than the blades and disposed immediately above said blades, the side edges of said blades being notched to comprise fingers, and of progressively increasing radius from the plate downwardly.

3. The device of claim 2 in which the said head comprises a central core from which said arms project integrally in cruciform cross section.

4. The device of claim 2 in which the said blades comprise wire arms having convoluted intermediate portions providing the fingers, said wire arms having upper end portions connected to the plate.

W ARTHUR ERNST.

References Cited in the file of this patent

UNITED STATES PATENTS

| Number | Name | Date |
| --- | --- | --- |
| 234,135 | Manning et al. | Nov. 9, 1880 |
| 407,885 | Winchell | July 30, 1889 |
| 1,002,135 | Shriver | Aug. 29, 1911 |
| 1,141,420 | Shattuck | June 1, 1915 |
| 1,278,405 | Watson | Sept. 10, 1918 |
| 1,352,272 | Jeffries et al. | Sept. 7, 1920 |
| 1,498,392 | Levy | June 17, 1924 |
| 1,592,601 | Hines | July 13, 1926 |
| 1,859,298 | Hackett | May 24, 1932 |
| 1,915,053 | Dobyns | June 20, 1933 |
| 2,108,398 | Allen | Feb. 15, 1938 |
| 2,254,236 | Myers | Sept. 2, 1941 |
| 2,290,025 | Bonsack | July 14, 1942 |